Oct. 3, 1967 D. HOWELL 3,345,467
TELEPHONE SYSTEMS AND APPARATUS
Filed July 2, 1964
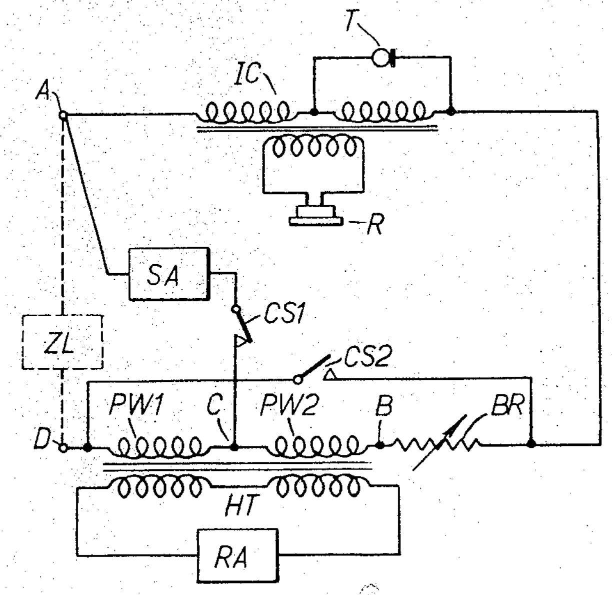
INVENTOR
Derek Howells
BY
Pierce, Scheffler & Parker
his ATTORNEYS United States Patent Office 3,345,467
Patented Oct. 3, 1967

3,345,467
TELEPHONE SYSTEMS AND APPARATUS

Derek Howell, Croydon, England, assignor to Telephone Manufacturing Company Limited Filed July 2, 1964, Ser. No. 379,986
Claims priority, application Great Britain, July 30, 1963, 30,143/63
6 Claims. (Cl. 179—81)

ABSTRACT OF THE DISCLOSURE

The induction coil circuit of a conventional telephone handset is, according to this invention, used as the balance arm impedance of a hybrid transformer of a loudspeaking telephone apparatus.

The present invention relates to telephone systems and apparatus and particularly to a hybrid coupling unit for loudspeaking telephone systems and apparatus of the type of which the loudspeaking equipment is connectable directly to the line wires in place of a conventional telephone handset.

Such loudspeaking telephone systems and apparatus employ a hybrid transformer to separate the speech directions and the effectiveness of separation, i.e. the extent to which leakage from one speech signal path through the transformer into another is prevented, is principally dependent upon matching of the balance arm impedance and the line impedance in such transformer. Since the principal line impedance is often constituted by the induction coil circuit of a conventional telephone handset at the remote end of the line, efficient separation is best achieved when the balance arm impedance matches the impedance of such circuit and includes a resistive element to balance the resistance of the line.

According to the invention there is provided a loudspeaking apparatus having a hybrid transformer bridge circuit arranged to connect the apparatus to line wherein the balance arm impedance of the hybrid transformer bridge circuit is constituted by the induction coil circuit of a conventional telephone handset associated with the loudspeaking apparatus.

Where the loudspeaking apparatus is of the type provided with a conventional handset for "private" calls the induction coil circuit of such handset is arranged to be connected into the hybrid transformer of the loudspeaking apparatus when the hand micro-telephone is resulting in its cradle and the loudspeaking equipment is switched into use.

The accompanying drawing is a part schematic circuit diagram of the speech signal circuit of a loudspeaking telephone apparatus incorporating the invention.

The circuit shown in the drawing is that of a hybrid coupling unit for a loudspeaking telephone apparatus provided with a conventional telephone handset for use when the loudspeaking facility is not required. It comprises a bridge circuit having four terminals A, B, C, D of which the line impedance constitutes one arm AD as indicated by the dotted line connection of the block ZL between terminal A and D when the line wires are connected to such terminals; two further arms DC and CB are constituted by two primary windings PW1 and PW2 of a hybrid transformer HT; and the fourth arm BA is constituted by a balance resistor BR in series with the induction coil circuit IC of the associated handset of which the receiver and transmitter are respectively indicated at R and T.

The receive channel amplifier of the loudspeaking apparatus which may be of any conventional form is indicated by the block RA connected across the secondary windings of transformer HT and the send channel amplifier which may also be of any conventional form is indicated by the block SA connected across the diagonal AC of the bridge circuit. The remainder of the circuit arrangement of the apparatus, not being affected by the incorporation of the invention, is omitted from the drawing for simplicity of illustration and can be assumed to be of any conventional form.

The cradle switch of the associated conventional handset has contacts CS1 and CS2 arranged to be actuated from the positions shown when the handset receiver is removed from the cradle to respectively open-circuit the send amplifier SA and short-circuit the primary windings of the transformer HT and balance resistor BR thus putting the loudspeaking apparatus out of action and connect such handset between the terminals A and D until the receiver is replaced in the cradle.

With such an arrangement whether the equipment at the other end of the line is a conventional handset or another loudspeaking unit of the same type, the impedances of the bridge arms will be completely matched provided the value of balance resistor BR matches the resistive component of line impedance ZL due to the resistance of the line itself. Resistor BR can either be a variable resistor as shown to permit complete matching or it can be a fixed resistor of a value selected to match the average line resistance expected to be encountered.

In practice it has been found, however, that the resistive component of the line impedance Z is of such small value that a satisfactory degree of matching is attained without balance resistor BR and it is therefore to be understood that this resistor may be omitted except where relatively long lines with substantial resistive impedance are involved.

I claim:

1. A hybrid coupling unit for coupling loudspeaking telephone apparatus to a telephone line said unit comprising a bridge network having first and second terminals for connection to the line wires as one arm of the bridge, a third terminal and a fourth terminal, hybrid means connecting said second and third terminals and said third and fourth terminals as two further arms of said bridge and a conventional telephone instrument comprising transmitter, receiver, cradle switch, and induction coil circuit having its induction coil circuit connected between said fourth and first terminals as the fourth arm of said bridge.

2. A hybrid coupling unit according to claim 1 wherein said hybrid means comprises a hybrid transformer having a first primary winding connecting said second and third terminals and a second primary winding connecting said third and fourth terminals.

3. A hybrid coupling unit according to claim 1 wherein said cradle switch includes normally open contacts connected between said induction coil circuit and said second terminal whereby to connect said induction coil circuit directly between said first and second terminals when said cradle switch is operated.

4. A hybrid coupling unit according to claim 1 wherein said cradle switch includes first normally open contacts connected between said induction coil circuit and said second terminal whereby to connect said induction coil circuit directly between said first and second terminals when said cradle switch is operated and second normally closed contacts connected to one of said first and third terminals whereby to disconnect from said coupling unit the send channel of said loudspeaking telephone apparatus connected between the other of said first and third terminals and said second contacts.

5. A hybrid coupling unit according to claim 1 including a line balance resistor connected in series with said induction coil circuit.

6. A hybrid coupling unit for coupling loudspeaking telephone apparatus to a telephone line said unit comprising a bridge network having first and second terminals for connection to the line wires as one arm of the bridge, a third terminal and a fourth terminal, a hybrid transformer having a first primary winding connecting said second and third terminals as a second arm of said bridge, a second primary winding connecting said third and fourth terminals as a third arm of said bridge, and a secondary winding means for connection to the receive channel of said loudspeaking telephone apparatus, a line balance resistor, a conventional telephone instrument comprising transmitter, receiver, cradle switch, and induction coil circuit, with its induction coil circuit connected in series with said line balance resistor between said fourth and first terminals, as the fourth arm of said bridge, and means for connecting the send channel of said apparatus between said first and third terminals as a diagonal of said bridge, said cradle switch having first normally open contacts connected to short circuit said first and second primary windings and said resistor when said cradle switch is operated and having second normally closed contacts connected to interrupt said diagonal of the bridge when said cradle switch is operated whereby upon operation of said cradle switch said conventional telephone is effectively connected across said first and second terminals and said loudspeaking telephone apparatus is effectively disconnected from said unit.

References Cited

FOREIGN PATENTS

| | | | |
|---|---|---|---|
| 1,104,561 | 4/1961 | Germany | 179—81 |
| 1,106,370 | 5/1961 | Germany | 179—81 |

KATHLEEN N. CLAFFY, *Primary Examiner.*

H. ZELLER, *Assistant Examiner.*